4. A device as claimed in claim 3 in which said first mentioned series tuned transmitting coil circuit includes a transmitting coil having an inductance at said fundamental frequency approximately at least four times the inductance of said reactor at said fundamental frequency.

5. A device as claimed in claim 4 in which said transmitter coil circuits comprise separate series tuned transmitter coils.

6. A device as claimed in claim 5 in which means are provided to support said transmitter coils in vertical coplanar relation.

7. A transmitting unit for an electromagnetic conductor prospecting apparatus comprising a gasoline engine driven alternating current generator capable of delivering a fundamental low frequency alternating current of substantially sinusoidal wave form, a series tuned transmitting coil connected in series with said generator and being adapted to form a resonant load for said generator acting to effect frequency regulations thereof, a saturable magnetic core reactor connectable in series with said transmitting coil and generator to distort said fundamental current and produce a current containing harmonics of the fundamental current, said transmitting coil having at said fundamental frequency an appreciably greater inductance than said reactor, a second series tuned transmitting coil connectable across at least a portion of said reactor and tuned to a selected harmonic of said fundamental frequency to resonate at said selected harmonic, and means to support said transmitting coils in a vertical position.

8. A device as claimed in claim 7 in which said saturable magnetic core reactor is arranged to saturate substantially at the point in the cycle of the fundamental current corresponding to the selected harmonic to which said second transmitting coil is tuned.

9. A device as claimed in claim 8 in which the inductance of the first transmitting coil is approximately four times the maximum induction of said saturable magnetic core prior to saturation of said core.

References Cited in the file of this patent

UNITED STATES PATENTS

| | | |
|---|---|---|
| 1,537,609 | Hogan | May 12, 1925 |
| 1,559,869 | Hartley | Nov. 3, 1925 |
| 1,718,351 | Guilford | June 25, 1929 |
| 1,818,331 | Jakosky | Aug. 11, 1931 |
| 2,117,752 | Wrathall | May 17, 1938 |
| 2,139,460 | Patapenko | Dec. 6, 1938 |
| 2,146,053 | Campbell | Feb. 7, 1939 |
| 2,288,486 | Riolin | June 30, 1942 |
| 2,354,636 | Hershberger | July 25, 1944 |
| 2,427,204 | Ferguson | Sept. 9, 1947 |
| 2,606,959 | Leitch et al. | Aug. 12, 1952 |
| 2,616,954 | Pruch et al. | Nov. 4, 1952 |
| 2,642,477 | Puranen et al. | June 16, 1953 |
| 2,690,537 | Weiss et al. | Sept. 28, 1954 |
| 2,776,373 | Mischler | Jan. 1, 1957 |

United States Patent Office 2,919,397
Patented Dec. 29, 1959

2,919,397
METHOD AND APPARATUS FOR INDUCTIVE PROSPECTING

Lawrence W. Morley, Manotick, Ontario, Canada, assignor to Her Majesty the Queen in the right of Canada as represented by the Minister of Mines and Technical Surveys Application April 30, 1956, Serial No. 581,439
1 Claim. (Cl. 324—6)

This invention relates to a method and apparatus for inductive prospecting.

It is well known, in geophysical exploration, to create an alternating magnetic field and to measure the distortion of the field caused by the presence of electrically conducting or magnetically permeable material in the neighborhood of the magnetic field. This may be done by placing a pick-up coil at a suitable distance from a transmitting coil which is radiating an alternating magnetic field. The signal in the pick-up coil is amplified and either the phase or the amplitude or both of the voltage in pick-up coil is measured. A problem which arises in respect of such systems is the difficulty in differentiating between the signal that is due to the effect of the earth and that due to the effect of misorientation between the transmitter and receiver coils.

It has heretofore been proposed to measure only the phase (which is insensitive to disorientation) of the received signal with reference to that of the transmitted signal, the amplitude of the out-of-phase component, the dip angle of the ellipse of polarization, or the difference or ratios of the amplitudes of two different frequencies.

It is an object of this invention to provide a simplified, effective method and means of measuring differences in response of rocks and mineral deposits to electromagnetic radiation.

The invention contemplates the steps of generating an alternating magnetic primary field at a single frequency, receiving radiations from a secondary field generated by said primary field, and measuring changes in amplitude of the received secondary field while cancelling the amplitude of the primary field by means of a signal received directly from said primary field.

The invention will be described with reference to the accompanying drawing, in which the single figure is a block diagram of a system in accordance with the invention.

Referring to the drawing, 1 is a conventional low frequency transmitter coil excited by an electronic oscillator or motor generator set 2, and arranged to create an electromagnetic primary field. A receiver 3 comprises a plurality (three as shown) of plane coils 4, each of substantially the same effective area and concentrically arranged with their axes in mutually orthogonal relation. Each coil is connected to a separate squaring circuit 5 of conventional design arranged to square the signal voltage in each coil. The added squares are amplified by a common amplifier 6 tuned to the frequency of the transmitter. It will be apparent that obvious alternatives of this arrangement are to place the squaring circuits on the output of separate amplifiers for each of three receiver coils or for the squaring circuits to be incorporated as part of the amplifiers and their signals then added.

In order to cancel the primary field, a pick-up coil 7 is arranged near the transmitter to pick up a portion of the primary field. The received signal is then carried by means of a circuit 8 which includes a variable resistor 9 through a 180° phase shifter 10 directly to the amplifier 6 through a suitable isolating network 11. It will be apparent that the amplitude of the signal can be adjusted to exactly null the signal received by the receiver coils through the air when no secondary field is present.

An underground body capable of re-radiating a secondary electromagnetic field is indicated at 12. A recorder 13 of standard type is connected to the output of amplifier 6.

It will be apparent that the system described does not require rigid connection of the transmitter and receiver coils. Thus, the receiver coils may be towed at a suitable distance from an aircraft or other vehicle in which the transmitter coil may be mounted.

It will also be apparent that the receiver described measures the amplitude but not the direction of the secondary field, the induction radiation transmitted by the transmitter coil being represented by a vector in space with a certain direction and amplitude, and similarly the secondary field re-radiated by the underground body being represented by another vector of different direction and amplitude.

It will thus be understood that, regardless of the orientation of the receiving coil array, the amplifier will amplify a signal which is proportional to the amplitude of the secondary field. Differences in amplitude of the received signal due to misorientation of transmitter and receiver coils will be automatically compensated for by virtue of the fact that the receiving coil array measures the sum of the squares of the three components of the primary field which is independent of the mutual orientation of transmitter and receiver coils.

The residual signal which is proportional to the amplitude of the secondary field is either recorded at the receiver coil location for ground surveys or at the transmitter location for airborne or waterborne surveys.

It will be apparent that various changes may be made in the system described within the spirit of the invention. For instance, two coils instead of three in the receiving coil array may be used if mutual misorientations of transmitter and receiver coils about one axis are sufficiently small to be unimportant.

What is claimed is:

Apparatus for detecting underground ore bodies which comprises a transmitter coil for generating at a single frequency an artificial electromagnetic alternating primary field, a receiver having a plurality of plane coils arranged with their axes in mutually orthogonal relation to detect the total value of the electromagnetic field including the artificially generated primary field and the re-radiations thereof from the earth's surface, an independent squaring circuit for each receiver coil, an amplifier receiving the combined output of said squaring circuits, a pickup coil physically and electrically spaced and independent of said plurality of plane coils and located adjacent said transmitter coil to receive a signal directly from said transmitter coil, a phase shifter to shift the phase of the signal of said pickup coil, means for applying said signal received from said pickup coil and passing from said phase shifter directly to said amplifier to cancel the amplitude of the signal obtained from said primary field, and recording means connected with said amplifier to record the amplitude of the output signal from said amplifier.

References Cited in the file of this patent
UNITED STATES PATENTS

| | | |
|---|---|---|
| 1,812,392 | Zuschlag | June 30, 1931 |
| 1,820,953 | Sundberg | Sept. 1, 1931 |
| 2,427,666 | Felch | Sept. 23, 1947 |
| 2,438,964 | Cunningham | Apr. 6, 1948 |
| 2,485,931 | Slonczewski | Oct. 25, 1949 |
| 2,741,736 | Puranen | Apr. 10, 1956 |
| 2,794,949 | Hedstrom | June 4, 1957 |